(12) United States Patent
Vijaywargi et al.

(10) Patent No.: US 9,992,335 B2
(45) Date of Patent: Jun. 5, 2018

(54) CALLER ASSISTANCE SYSTEM

(71) Applicant: Microsoft Technology Licensing, LLC, Redmond, WA (US)

(72) Inventors: Deepak Vijaywargi, Sunnyvale, CA (US); Yicheng Tao, San Jose, CA (US); Shashank Singh, Milpitas, CA (US); Mikhail Birman, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 15/338,268

(22) Filed: Oct. 28, 2016

(65) Prior Publication Data

US 2018/0124241 A1 May 3, 2018

(51) Int. Cl.
*H04M 3/00* (2006.01)
*H04M 5/00* (2006.01)
*H04M 3/51* (2006.01)
*H04M 3/42* (2006.01)
*H04M 3/523* (2006.01)

(52) U.S. Cl.
CPC ..... *H04M 3/5166* (2013.01); *H04M 3/42042* (2013.01); *H04M 3/5191* (2013.01); *H04M 3/5237* (2013.01); *H04M 2201/39* (2013.01); *H04M 2201/40* (2013.01)

(58) Field of Classification Search
CPC ........... H04M 3/5166; H04M 3/42042; H04M 3/5191; H04M 3/5237; H04M 2201/39; H04M 2201/40
USPC ................................................... 379/265.09
See application file for complete search history.

(56) References Cited

U.S. PATENT DOCUMENTS

| | | | |
|---|---|---|---|
| 5,187,735 A * | 2/1993 | Herrero Garcia | H04M 3/42 379/211.02 |
| 6,697,461 B1 * | 2/2004 | Middlesworth | H04M 3/436 379/221.08 |
| 8,279,779 B2 | 10/2012 | Singh et al. | |
| 8,804,944 B1 | 8/2014 | Hopkins | |
| 9,100,481 B2 | 8/2015 | O'Connor et al. | |
| 9,241,067 B2 | 1/2016 | Clark | |
| 9,294,624 B2 | 3/2016 | Williams et al. | |

(Continued)

OTHER PUBLICATIONS

Stein, Benjamin, "How Bots Can Make Communications More Human", Published on: Jul. 28, 2016 Available at: https://www.entrepreneur.com/article/279870.

(Continued)

*Primary Examiner* — Quynh Nguyen

(57) ABSTRACT

Techniques and technologies for caller assistance systems are described. In at least some embodiments, a system comprises: a processing component; and a caller assistance engine configured to receive a request from a calling device; select a menu execution path associated with the request, the menu execution path defining one or more operations to be performed to achieve an intent of the request; execute the menu execution path including execute the one or more operations to be performed to achieve the intent of the request; determine whether the intent of the request has been achieved; and when the intent of the request has been achieved, connect the calling device with the intent of the request or provide an alert to the calling device that the intent of the request has been achieved.

20 Claims, 7 Drawing Sheets

(56) References Cited

U.S. PATENT DOCUMENTS

| | | |
|---|---|---|
| 9,386,152 B2 | 7/2016 | Riahi et al. |
| 2007/0088701 A1 | 4/2007 | Rao |
| 2009/0285385 A1 | 11/2009 | Dunbar et al. |
| 2012/0215579 A1 | 8/2012 | O'Connor et al. |
| 2015/0172463 A1 | 6/2015 | Quast et al. |
| 2016/0134752 A1 | 5/2016 | Aldecoa et al. |

OTHER PUBLICATIONS

"Conversica's Virtual Sales Assistant", Published on: Feb. 5, 2016 Available at: https://virtualagentchat.com/category/intelligent-virtual-agent-vendors/.

"What is a Customer Support Chatbot?", Retrieved on: Sep. 9, 2016 Available at: http://www.aspect.com/glossary/customer-support-chatbot.

"Googlebot", Retrieved on: Sep. 9, 2016 Available at: https://support.google.com/webmasters/answer/182072?hl=en.

"Virtual Chat", Retrieved on: Sep. 9, 2016 Available at: http://www.bmc.com/it-solutions/virtual-chat.html.

\* cited by examiner

CALLER ASSISTANCE SYSTEM

BACKGROUND

Many commercial enterprises and government organizations employ call centers that receive incoming telephone calls and handle such calls using an automated system, such as an Interactive Voice Response (IVR) system. Calling to such a call center typically involves interacting with the automated system, navigating through various automated menus, speaking to a machine, and waiting for an unknown amount of time before being afforded the opportunity to speak to an actual human representative. It is generally known that such automated menus are not always straight forward for callers to understand, and may require a repetitive trial-and-error process before negotiation of an automated menu is successful. In addition, machines are not always adept at understanding a caller's voice in different background settings, or with different callers having different accents which the machine may not have heard before or been trained to understand, resulting in sub-optimal customer experience. In addition, the length of time the caller is forced to wait in a queue depends on several factors, such as availability of the human representative, and callers typically do not know how long they will need to wait for the representative to become available.

SUMMARY

Techniques and technologies for a caller assistance system are described that may provide considerable advantages over conventional systems.

For example, in at least some implementations, a system comprises: a processing component operatively coupled to a memory; a caller assistance engine at least partially stored on the memory, the caller assistance engine including one or more instructions executable by the processing component configured to perform one or more operations including at least: receiving a request from a calling device; selecting a menu execution path associated with the request, the menu execution path defining one or more operations to be performed to achieve an intent of the request; executing the menu execution path including executing the one or more operations to be performed to achieve the intent of the request; determining whether the intent of the request has been achieved; and when the intent of the request has been achieved, at least one of: connecting the calling device with the intent of the request, or providing an alert to the calling device that the intent of the request has been achieved.

Alternately, in at least some implementations, a caller assistance system, comprises: a processing component operatively coupled to a memory; a caller assistance engine at least partially stored on the memory, the caller assistance engine including one or more instructions executable by the processing component configured to perform one or more operations including at least: contacting an automated call-routing system; translating one or more voice scripts output by the automated call-routing system into one or more intents; constructing one or more menu execution paths, each menu execution path defining one or more operations to be performed to achieve a corresponding one of the one or more intents; and storing the one or more menu execution paths and the one or more intents into a data store, each menu execution path being associated with the corresponding one of the one or more intents.

Furthermore, in at least some implementations, a method of providing assistance to a caller, comprises: receiving a request from a calling device; analyzing the request received from the calling device using at least one processing component; determining the intent embodied within the request using the at least one processing component; matching the intent with a possible requested intent stored within a data store using the at least one processing component; selecting a menu execution path associated with the possible requested intent from the data store using the at least one processing component, the menu execution path defining one or more operations to be performed to achieve an intent of the request; executing the menu execution path including executing the one or more operations using the at least one processing component to achieve the intent of the request; determining whether the intent of the request has been achieved using the at least one processing component; and when the intent of the request has been achieved, at least one of: connecting the calling device with the intent of the request using the at least one processing component, or providing an alert to the calling device using the at least one processing component that the intent of the request has been achieved.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the use of the same reference numbers in different figures indicates similar or identical components.

DETAILED DESCRIPTION

The present disclosure describes techniques and technologies for a caller assistance system. As described more fully below, in at least some implementations, a caller assistance system in accordance with the present disclosure may advantageously assist a caller in reaching a human representative of a call center, and may substantially reduce, or even eliminate, the amount of time the caller is forced to spend navigating through an automated menu and listening on hold for a human representative to come onto the call.

Figure 1:
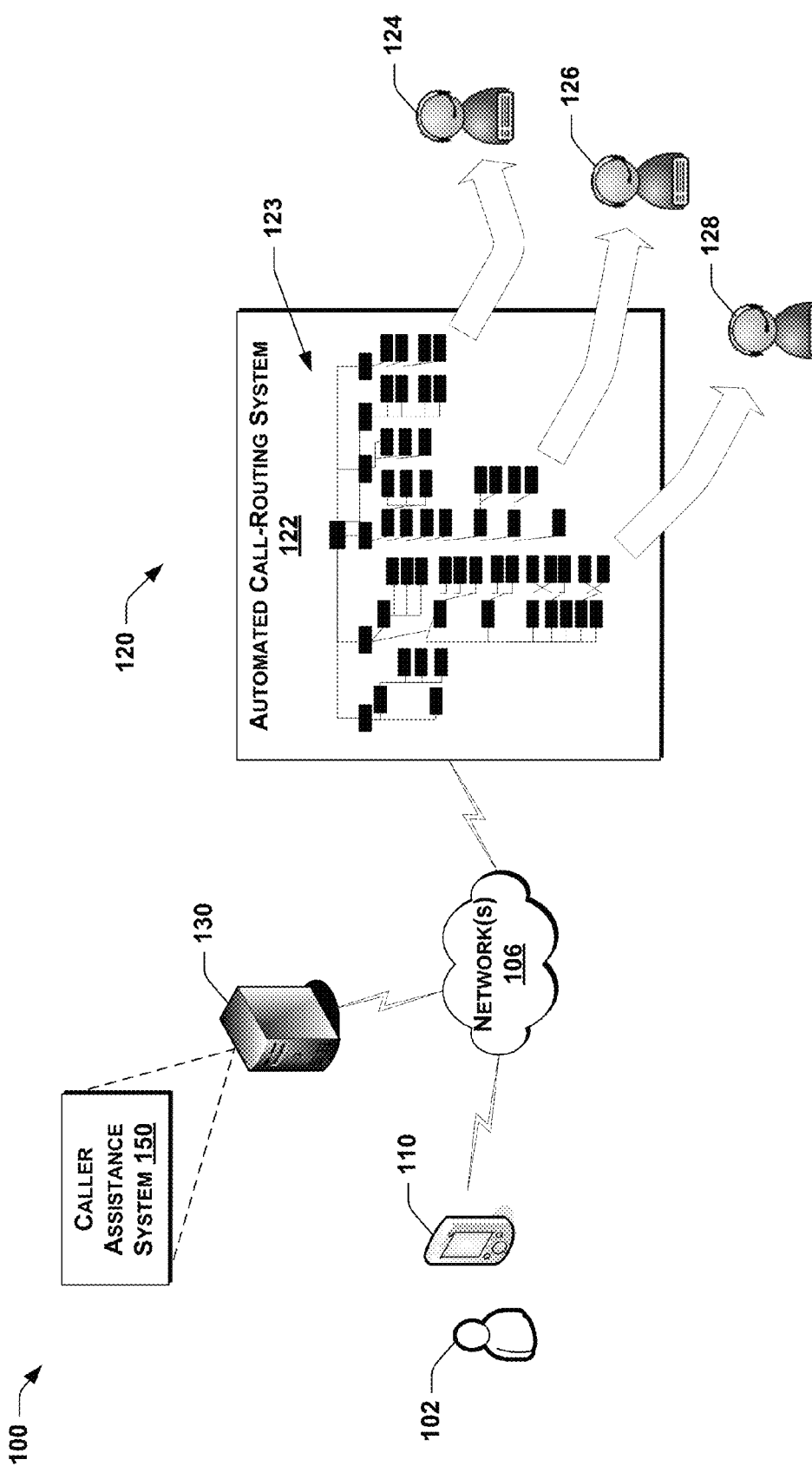
FIG. 1 shows an embodiment of an environment for a caller assistance system.

FIG. 1 shows an embodiment of an environment 100 for a caller assistance system in accordance with the present disclosure. In this embodiment, the environment 100 includes a calling device 110 that is configured to place calls to a call center 120 via one or more networks 106. The call center 120 includes an automated call-routing system 122 that receives inputs in response to queries, enabling the calling device 110 to navigate through a menu 123 of possible options. For example, in at least some implementations, the automated call-routing system 122 includes an Interactive Voice Response (IVR) system. IVR systems are generally known and typically use a computing device to interact with callers through voice recognition or through tones (e.g. Dual-tone Multi-Frequency (DTMF) signals, etc.) that may be generated by a caller 102 pressing various keys on a keypad of the calling device 110.

In the embodiment shown in FIG. 1, the menu 123 of the automated call-routing system 122 may enable an incoming call to be routed to various destinations, including eventually allowing the caller 102 to speak directly with the one or more human operators 124, 126, 128 as they become available. Alternately, based on the inputs provided to the menu 123, the incoming call may be routed to other destinations and may receive desired information from (or provide information to) the automated call-routing system 122, without the caller 102 speaking to the one or more human operators 124, 126, 128.

As further shown in FIG. 1, the environment 100 further includes an assistance server 130 having a caller assistance system 150 in accordance with the present disclosure. As described more fully below, the caller assistance system 150 may receive a request from the calling device 110 (e.g. via the one or more networks 106), analyze the request received from the calling device 110, and then automatically interact with the automated call-routing system 122 of the call center 120 by executing a series of operations to facilitate reaching a desired destination within the menu 123 of the automated call-routing system 122 to achieve the request from the calling device 110 (i.e. from the user 102).

In the embodiment shown in FIG. 1, the calling device 110 is depicted as a cellular telephone. It will be appreciated, however, that in other embodiments, the calling device 110 may be any other suitable type of device, such a Personal Data Assistant (PDA), a notebook computer, a tablet computer, a slate computer, a laptop computer, a smart watch, or any other handheld device. Alternately, in still other embodiments, the calling device 110 may be a desktop computing device, a mainframe (or server) device, a vehicle (e.g. automobiles, robotic vehicles, aircraft, watercraft, trains, subways, etc.), a household appliance, or any other suitably configured device.

Figure 2:
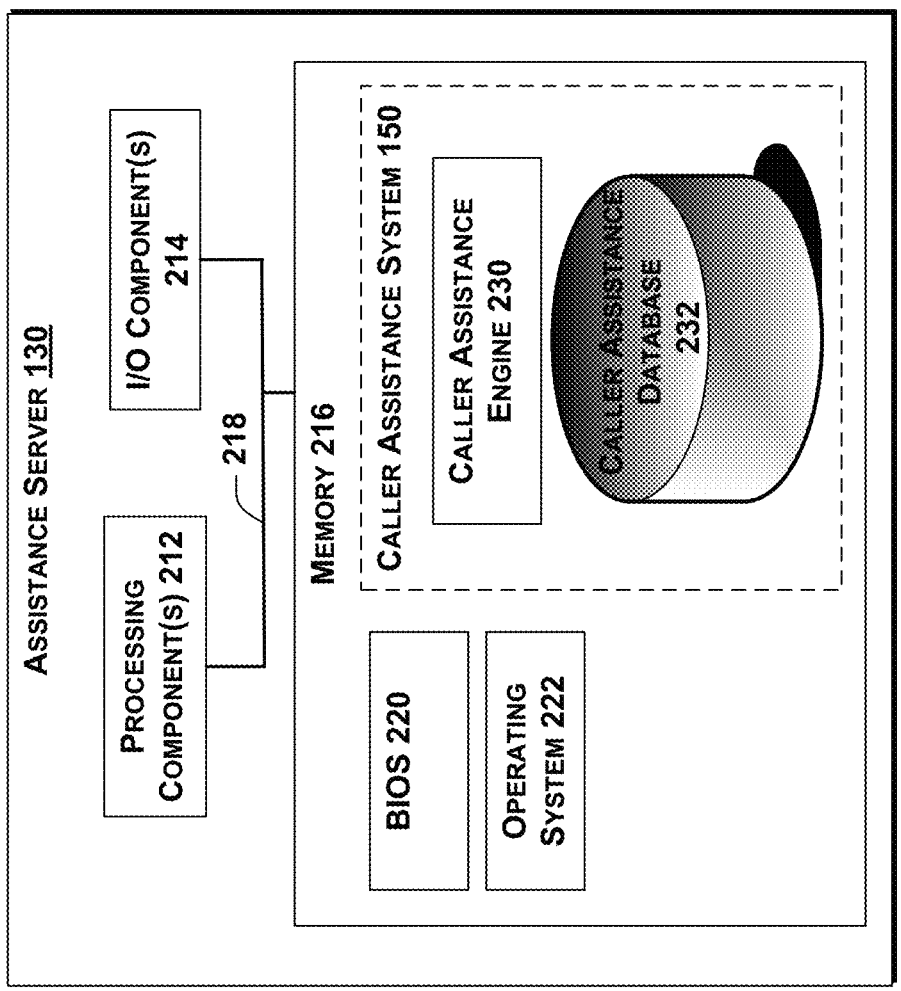
FIG. 2 shows an embodiment of an assistance server of FIG. 1.

FIG. 2 shows an embodiment of the assistance server 130 of FIG. 1. In this embodiment, the assistance server 130 includes one or more processing components 212 and one or more input/output (I/O) components 214 coupled to a memory 216 by a bus 218. The memory 216 includes a basic input/output system (BIOS) 220 that provides basic routines, including facilitating the transfer of information between elements within the system 150, and an operating system 222 that manages and provides common services to the various elements of the system 150.

As further shown in FIG. 2, the assistance server 130 further includes the caller assistance system 150 stored within the memory 216. As shown in FIG. 2, in at least some implementations, the caller assistance system 150 includes a caller assistance engine 230 and a caller assistance database 232. In alternate implementations, however, the boundaries of the caller assistance system 150 may be adjusted to include other components of the assistance server 130 (e.g. processing components 212, I/O components 214, BIOS 220, OS 222, etc.). In at least some implementations, the caller assistance engine 230 may include executable instructions that, when executed by the one or more processing components 212, perform one or more operations described herein for assisting a caller in accordance with the present disclosure. In alternate implementations, the caller assistance engine 230 may be at least partially implemented using circuitry, such as using Application Specific Integrated Circuits (ASICs), Field Programmable Gate Arrays (FPGAs), or other suitable circuitry or components. In at least some implementations, when the one or more processing components 212 are executing the executable instructions of the caller assistance engine 230, then the one or more processing components 212 may become circuitry configured for performing one or more operations for assisting a caller in accordance with the present disclosure, as described more fully below.

Figure 3:
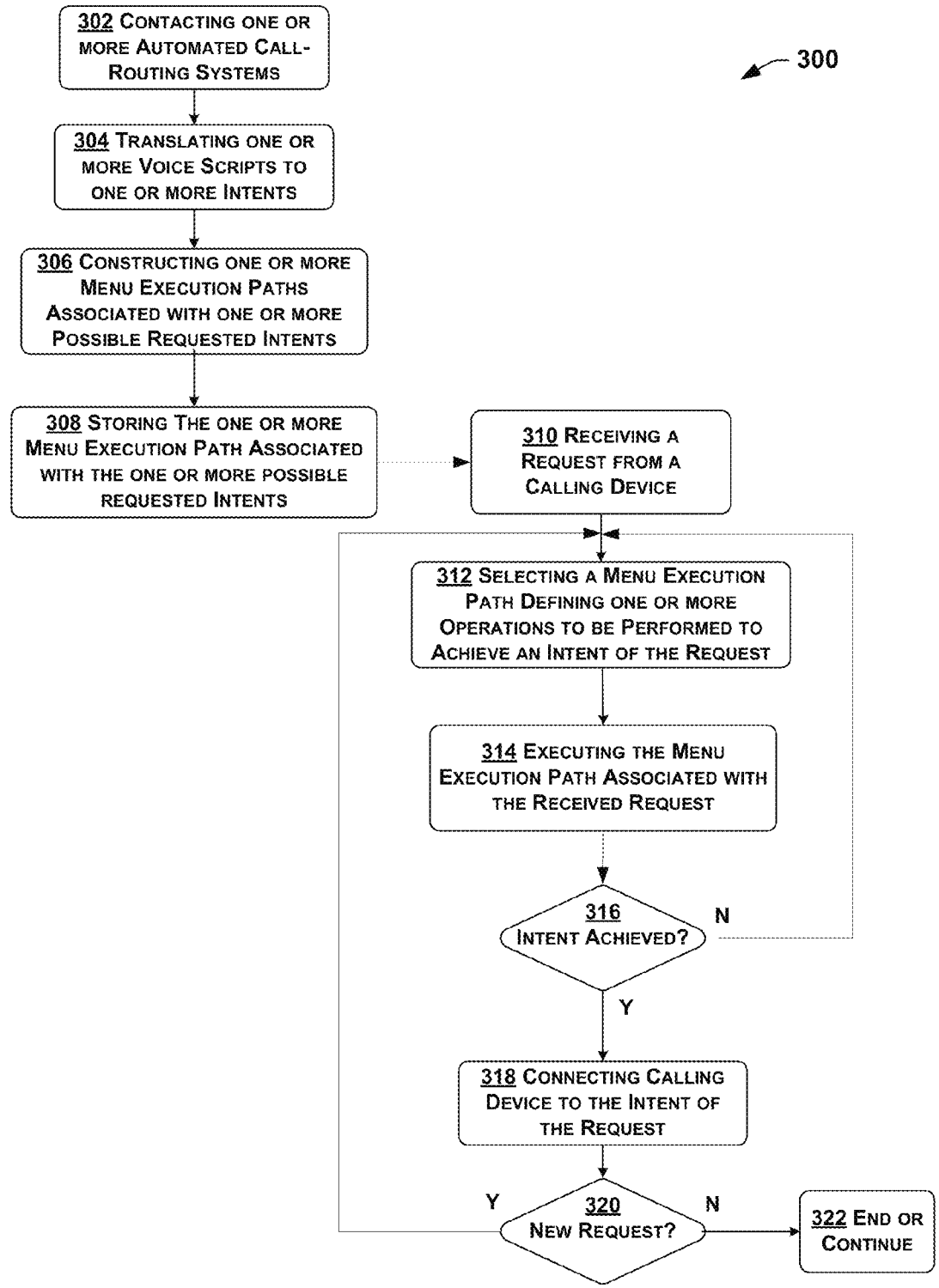
FIG. 3 shows an embodiment of a caller assistance process.

FIG. 3 shows an embodiment of a caller assistance process 300. In this embodiment, the caller assistance process 300 is described from the perspective of an assistance server (e.g. an assistance server 130 of FIG. 1), or alternately, from the perspective of a caller assistance system (e.g. system 150 of FIGS. 1-2). More specifically, the process 300 includes contacting one or more automated call-routing systems at 302. For example, in at least some implementations, the contacting (at 302) may include the caller assistance engine 230 crawling (or otherwise contacting) each call center of a list of various call centers or phone menus.

The process 300 shown in FIG. 3 further includes translating one or more voice scripts to one or more intents at 304. For example, in at least some implementations, the translating (at 304) may include the caller assistance engine 230 recording audible inputs from an automated call-routing system (e.g. an IVR system) of the call center, storing such audible inputs (e.g. storing into the caller assistance database 232, or the memory 216, or elsewhere), performing a voice recognition analysis of the audible inputs to convert the audible inputs into text, and then analyzing the text to determine one or more intents embodied within the audible inputs. In at least some implementations, the translating (at 304) may further include the caller assistance engine 230 analyzing the text and determining one or more possible responsive outputs that may be provided back to the automated call-routing system (e.g. voice or spoken outputs, DTMF tones, etc.) responsive to the audible inputs from the automated call-routing system to achieve the one or more intents.

As further shown in FIG. 3, the process 300 further includes constructing one or more menu execution paths associated with one or more possible requested intents at 306, and storing the one or more menu execution paths associated with the one or more possible requested intents at 308 (e.g. the caller assistance engine 230 storing the menu execution paths constructed at 306 in the caller assistance database 232). For example, in at least some implementations, the constructing (at 306) may include creating a voice transcript (or simulated speech output) that may be provided to a menu of an automated call-routing system that requires a spoken user response. Alternately, in at least some implementations, the constructing (at 306) may include creating a tone (e.g. DTMF tone) that may be provided to a menu of an automated call-routing system that requires, for example, a user to press a particular number on a keypad to make a desired selection.

More specifically, in at least some implementations, the constructing (at 306) may include the caller assistance engine 230 defining a possible requested intent that may be received from a calling device (e.g. "contact customer representative of Company X billing department," "determine current account balance at Company Y," etc.), and then, based on the results of the translating (at 304), defining a set of operations that may be performed by the caller assistance engine 230 (or the assistance server 130) to achieve the possible requested intent. For example, in a representative embodiment, if the possible requested intent is "contact customer representative of Company X billing department," the constructing (at 306) may define a menu execution path as follows: "dial 800-331-0500, wait 17 seconds, send tone associated with pressing 1, wait 20 seconds, send tone associated with pressing 0, listen until voice of human customer representative is recognized." In at least some implementations, the constructing (at 306) may be accomplished repeatedly and may result in the construction of many menu execution paths (e.g. hundreds, thousands, tens of thousands, etc.) associated with many possible requested intents (e.g. hundreds, thousands, tens of thousands, etc.) associated with many possible menus of many possible automated call-routing systems.

The process 300 further includes receiving a request from a calling device at 310. For example, in at least some implementations, the receiving (at 310) may include receiving a written request (e.g. text, SMS (Short Messaging System) message, etc.), receiving an audio request (e.g. spoken request, tonal code, etc.), receiving a gesture-based request (e.g. wave, finger movement, etc.), or any other suitable form of request or combinations thereof.

As further shown in FIG. 3, the process 300 further includes selecting a menu execution path defining one or more operations to be performed to achieve an intent of the request at 312. For example, in at least some implementations, the selecting (at 312) may include the caller assistance engine 230 analyzing the request received from the calling device, determine the intent embodied within the received request (e.g. "contact customer representative of Company X billing department"), matching the requested intent with one of the possible requested intents stored within the caller assistance database 232, and then selecting the stored menu execution path associated with the possible requested intent (stored at 308) (e.g. "dial 800-331-0500, wait 17 seconds, send tone associated with pressing 1, wait 20 seconds, send tone associated with pressing 0, listen until voice of human customer representative is recognized"). In at least some implementations, the selecting (at 312) may include analyzing a text version of the request to determine one or more keywords contained within the text version of the request; and matching the one or more keywords contained within the text version of the request with one or more corresponding keywords of at least one possible intent stored within a data store.

Next, the process 300 includes executing the menu execution path associated with the received request at 314. For example, in at least some implementations, the executing (at 314) includes the caller assistance engine 230 performing the operations included in the menu execution path (e.g. "dial 800-331-0500, wait 17 seconds, send tone associated with pressing 1, wait 20 seconds, send tone associated with pressing 0, listen until voice of human customer representative is recognized") using one or more of the components of the assistance server 130 (e.g. processing components 212, I/O components 214, BIOS 220, OS 222, etc.). In at least some implementations, the caller assistance engine 230 (and/or the assistance server 130) may be configured to provide any and all necessary inputs to the automated call-routing system (e.g. IVR, etc.) to execute the menu execution path. For example, in at least some implementations, the caller assistance engine 230 (and/or the assistance server 130) may be configured to provide DTMF tones to the automated call-routing system, speech or voice outputs (simulated or pre-recorded) to simulate a person speaking, or other suitable outputs that are received by the automated call-routing system. In addition, in at least some implementations, the caller assistance engine 230 (and/or the assistance server 130) may be configured to access and provide relevant personal information associated with the caller to the automated call-routing system, such as by accessing a secure user profile associated with the caller that may be stored within the caller assistance database 232 and that may include personal information or data that is specific to the caller (e.g. account number, password, identification number, birth date, answers to security questions, etc.) that may be needed by the caller assistance engine to successfully respond to and navigate the menu of the automated call-routing system to satisfy a request received from the user (at 310).

With continued reference to FIG. 3, the process 300 includes determining whether the intent of the request received from the calling device has been achieved at 316. For example, in the representative example wherein the requested intent from the received request is "contact customer representative of Company X billing department" the determination (at 316) may include determining when a customer service representative (i.e. a live human being and not a machine) of the billing department of Company X has been reached and is actually on the line. More specifically, in at least some implementations, the determining (at 316) may include receiving an audio signal, and determining whether the audio signal is indicative of a voice of an actual human (e.g. a customer service representative).

Alternately, in the representative example wherein the requested intent from the received request is "determine current account balance at Company Y," the determining (at 316) may include determining that a destination within the automated call-routing system of Company Y has been reached wherein the caller may listen to the current account balance. Similarly, in alternate implementations, the determining (at 316) may include determining that a destination within an automated call-routing system has been reached for providing a payment, determining a status, updating information, speaking to one or more human representatives, or any other suitable destination associated with any other suitable intent embodied in a request received from a calling device (at 310). More specifically, in at least some implementations, the determining (at 316) may include receiving an audio signal indicative of a human speech, and performing a speech recognition process on the audio signal to determine whether the intent of the request has been achieved.

If it is determined (at 316) that the intent of the request received from the calling device has not been achieved, then the process 300 returns to selecting a menu execution path (at 312), and repeats one or more of the above-described operations associated with selecting a menu execution path (at 312), executing the menu execution path (at 314), and determining whether the requested intent was achieved (at 316). For example, depending upon the reason for the failure to achieve the desired intent (determined at 316) (e.g. reaching an incorrect destination), the selecting (at 312) may include selecting a different menu execution path from the previously-selected menu execution path that did not achieve the requested intent (determined at 316), however, depending upon other reasons for the failure (e.g. busy signal, accidental signal interruption, etc.), the selecting (at 312) may include selecting the same menu execution path to try again.

Once it is determined (at 316) that the intent of the request received from the calling device has been achieved, then the process 300 includes connecting the calling device to the intent of the request (e.g. a desired destination) at 318. For example, in at least some implementations, the connecting (at 318) may include connecting the calling device with the call that has reached a customer service representative, an account balance destination, an automated payment system, a destination that receives information, or any other desired destination in accordance with the request. In at least some implementations, such as when the intent of the request is to reach a customer representative (i.e. a live human being), the connecting (at 318) may also include providing a message to the customer service representative (the intent of the request) that they are now being connected with a caller and requesting the customer service representative to hold the line until the connection is completed.

As further shown in FIG. 3, the process 300 includes determining whether a new request (or additional request) has been received from the calling device at 320. If it is determined that a new (or additional) request has been received (at 320), then the process 300 returns to selecting a menu execution path associated with the request received from the calling device (at 312), and the above-described operations 312 through 318 are repeated one or more times until no new (or additional) requests are received (at 320). Once it is determined that no new (or additional) request has been received (at 320), then the process 300 ends or continues to other operations at 322.

It will be appreciated that techniques and technologies for caller assistance systems are not necessarily limited to the particular embodiment of the process 300 shown in FIG. 3. In at least some implementations, the process 300 may be divided into a first part that includes, for example, operations 302 through 308, and a second part that includes operations 310 through 320. In such an implementation, techniques and technologies in accordance with the present disclosure (e.g. the caller assistance system 150, the assistance server 130, etc.) may iteratively perform operations associated with the first part of the process 300 by contacting various call-routing systems (at 302), translating voice scripts into intents (at 304), and constructing and storing menu execution paths (at 306 and 308) to build up a database of menu execution paths (e.g. stored in caller assistance database 232) that are ready and available for use by callers. Similarly, in at least some implementations, techniques and technologies in accordance with the present disclosure may independently perform operations associated with the second part of the process 300 by receiving requests from calling devices (at 310), selecting appropriate menu execution paths (at 312), executing the menu execution paths (at 314), achieving the desired intents (at 316), and connecting the calling devices to the desired destinations (at 318). Thus, in at least some implementations, techniques and technologies in accordance with the present disclosure may perform the database-building operations associated with the first part of the process 300 in an off-line fashion (e.g. during off-peak hours, during periods of high bandwidth availability, etc.), and may perform the call-assistance operations associated with the second part of the process 300 in an on-line fashion (e.g. during peak hours, on an always-available basis, etc.).

It will be appreciated that techniques and technologies for caller assistance systems in accordance with the present disclosure may provide considerable advantages over conventional systems. For example, in at least some implementations, because the techniques and technologies in accordance with the present disclosure allow a user of a calling device to send a request to a caller assistance system which, in turn, will handle the operations associated with reaching a desired destination for the user (e.g. execution of a menu execution path, listening until the desired destination becomes available, etc.), the processing resources of the calling device associated with achieving the user's desired destination (or intent) are substantially reduced. More specifically, the processing burden and energy consumption by the calling device associated with the caller using the calling device to navigate a menu of an automated call-routing system is substantially reduced or eliminated. Such savings may be particularly substantial for those circumstances that may require multiple attempts by the caller to successfully navigate the automated call-routing menu (e.g. due to a complex or confusing menu, a call-routing system that does not successfully understand the caller's accent, etc.), or that may require a caller to wait on hold an extended period of time while waiting for a human representative (or other desired destination) to become available. Thus, techniques and technologies for caller assistance systems in accordance with the present disclosure may greatly extend the life of batteries (or other components) of the calling device by shifting the processing and energy-consumption burdens to an assistance system (e.g. an assistance server 130) that may perform such operations relatively more efficiently and effectively by using one or more pre-determined menu execution paths to achieve the desired destination.

In addition, it will be appreciated that techniques and technologies for caller assistance systems in accordance with the present disclosure may provide considerable advantages to callers (or users). Because the user of the calling device only needs to send a request to the caller assistance system, and then wait to be contacted by the caller assistance system when it is time to connect to the desired destination, the caller is not required to navigate the menu of the automated call-routing system or to wait on hold until a desired destination is reached, and may thereby experience time savings, increased convenience, and reduced stress in comparison with users of conventional systems. Thus, users of caller assistance systems in accordance with the present disclosure may experience substantial satisfaction.

In general, techniques and technologies disclosed herein for caller assistance systems may be described in the general context of computer code or machine-useable instructions, including computer-executable instructions such as program modules, being executed by a computer or other device. Generally, program modules including routines, programs, objects, components, data structures, etc., refer to code that perform particular tasks or implement particular abstract data types. Various embodiments of the invention may be practiced in a variety of system configurations, including specialty computing devices, hand-held devices, consumer electronics, etc. In addition, various embodiments of the invention may also be practiced in distributed computing environments (e.g. cloud-based computing systems) where tasks are performed by remote-processing devices that are linked through a communications network.

Figure 4:
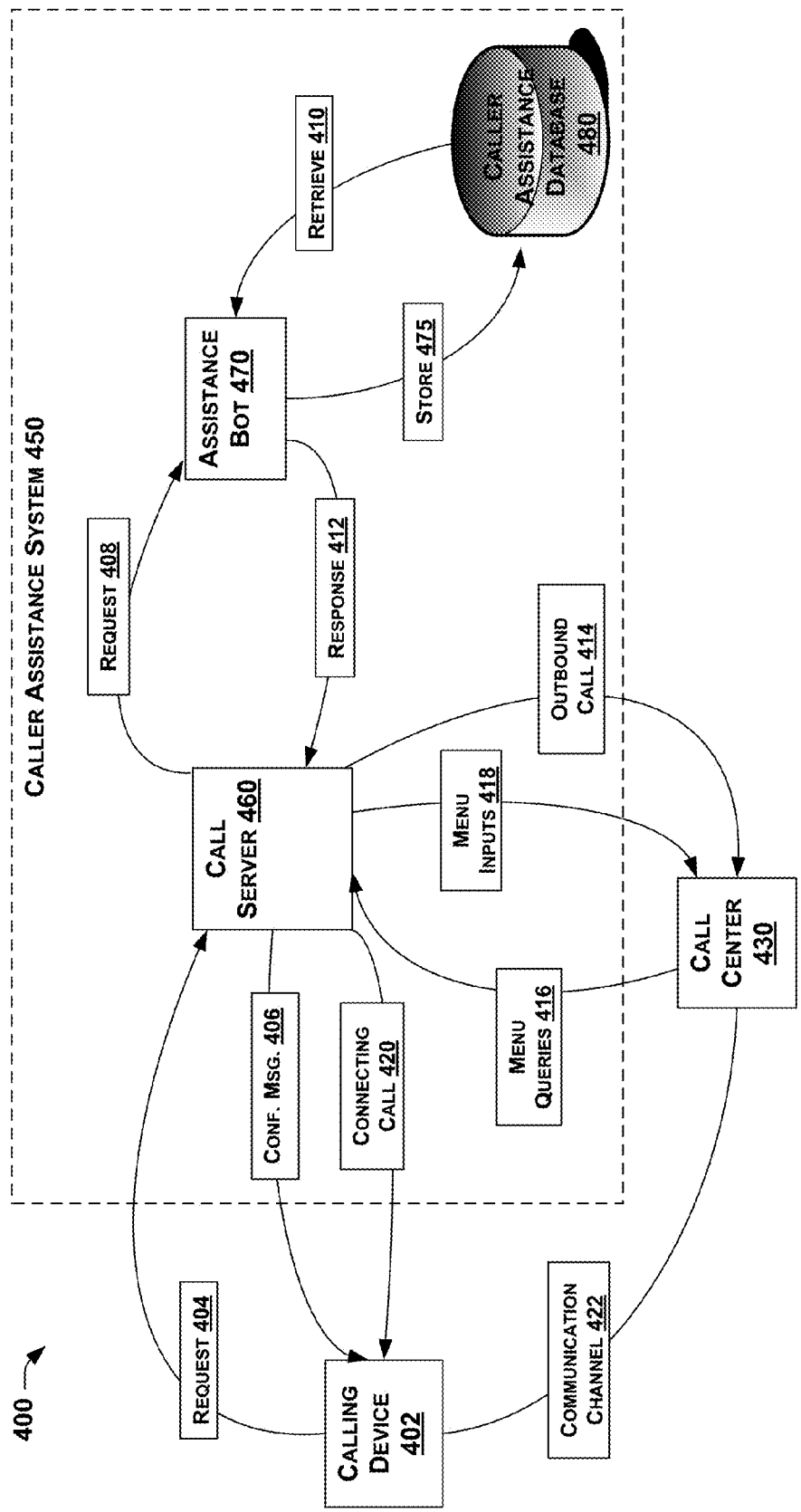
FIG. 4 shows another embodiment of an environment for a caller assistance system.

Again, it should be appreciated that techniques and technologies for caller assistance systems are not necessarily limited to the particular embodiments described above. For example, FIG. 4 shows another embodiment of an environment 400 for a caller assistance system 450 in accordance with the present disclosure. In this embodiment, the environment 400 includes a calling device 402 operatively configured to communicate with a caller assistance system 450 and with a call center 430. In at least some implementations, the call center 430 may be a customer service call center of a commercial enterprise.

In the embodiment shown in FIG. 4, the caller assistance system 450 includes a call server 460, an assistance bot 470, and a caller assistance database 480. In at least some implementations, the assistance bot 470 and the caller assistance database 480 may be installed on the call server 460, or alternately, may be operating on one or more hardware devices that may be separate from the call server 460 (as depicted in FIG. 4, one or more separate hardware devices not shown).

In at least some implementations, as described above with reference to FIG. 3, the caller assistance system 450 may iteratively perform operations associated with contacting (at 302) various call-routing systems of call centers (e.g. call center 420), translating voice scripts into intents (at 304), and constructing and storing menu execution paths (at 306 and 308) to build up a database of menu execution paths that are ready and available for use by callers. In the embodiment shown in FIG. 4, the assistance bot 470 of the caller assistance system 450 may store 475 the constructed menu execution paths into the caller assistance database 480 for later use in response to requests for the calling device 402.

In operation, in at least some implementations, a caller may invoke the caller assistance system 450 by activating a menu option or a "button" on the calling device 402, resulting in the calling device 402 transmitting a request 404 to the caller assistance system 450 (e.g. to the call server 460) that specifies a desire to be connected with a desired destination of the call center 430. For instance, in a representative example, the request 404 may include an SMS message that reads "connect me to customer service representative of Company Z."

In the embodiment shown in FIG. 4, the call server 460 of the caller assistance system 450 receives the request 404, and the call server 460 may then transmit a confirmation message 406 to the calling device 402 to confirm that the request 404 has been received. The call server 460 may analyze or interpret the request 404 to ascertain the intent (e.g. desired destination) of the request 404, and may then transmit a request 408 to the assistance bot 470 to provide a menu execution path corresponding to the intent of the original request 404. In at least some implementations, the request 408 may have the form of a REST-based (Representational State Transfer) request to an API (Application Program Interface) of the assistance bot 470. More specifically, in at least some implementations, the request 408 may have the form of a "webhook" API (or HTTP push API) that provides the assistance bot 470 with information or data needed by the assistance bot 470 to select the corresponding menu execution path corresponding to the intent of the original request 404.

In at least some implementations, the assistance bot 470 analyzes the request 408 from the call server 460 and determines the corresponding menu execution path that is needed to satisfy the intent of the original request 404. In at least some implementations, the assistance bot 470 performs a retrieve 410 of the appropriate menu execution path from the caller assistance database 480, and transmits a response 412 to the call server 460 that contains (or otherwise references) the appropriate menu execution path. Alternately, the assistance bot 470 may compile one or more commands or execution paths to create the appropriate menu execution path. In at least some implementations, the response 412 may include XML (Extensible Markup Language), JSON (JavaScript Object Notation), or other suitable communications that direct the call server 460 regarding how to communicate with the call center 470. For example, in at least some implementations, the response 412 may include a Twilio Markup Language (TwiML) response that directs the call server 460 to a URL (Uniform Resource Locator) to obtain the necessary menu execution path to satisfy the intent of the original request 404.

With continued reference to FIG. 4, the call server 460 may execute the menu execution path provided by the assistance bot 470, including placing an outbound call 414 to the call center 430 (wherein the call center 430 is a customer service call center associated with Company Z), receiving one or more menu queries 416 from a menu of an automated call-routing system of the call center 430, and providing one or more responsive menu inputs 418 to the call center 430 to navigate the menu of the automated call-routing system of the call center 430. In at least some implementations, the one or more menu queries 416 may include audio signals (e.g. voice or speech queries, tones, DTMF signals, etc.), and the one or more responsive menu inputs 418 may include responsive audio signals (e.g. voice or speech inputs, tones, DTMF signals, etc.).

In at least some implementations, the communications (e.g. request 408 and response 412) between the call server 460 and the assistance bot 470 may actually include a sequence (or series) of webhooks/REST API calls rather than a single request 408 and single response 412. Similarly, the communications between the call center 460 and the call center 430 (e.g. outbound call 414, menu queries 416, and menu inputs 418) may represent a sequence (or series) of attempts rather than a single exchange. For example, in at least some implementations, the assistance bot 470 may provide an initial webhook/API (e.g. response 412) for the call server 460 when a call request 404 is received at the call server 460. The call server 460 may then use the initial webhook/API in an attempt to contact the call center 430. Meanwhile, in at least some implementations, the assistance bot 470 may send along a next webhook/API (e.g. as response 412). When the call server 460 is done with previous webhook/api (e.g. by placing call 414, receiving menu queries 416, and providing menu inputs 418), and if it is not successful, the call server 460 may then call the next webhook/API (provided by the assistance bot 470). Alternately, in at least some implementations, the assistance bot 470 may wait to provide the next webhook/API upon receiving information from the call server 460 that a previous attempt was unsuccessful. More specifically, in at least some implementations, the call server 460 may provide an indication to the assistance bot 470 that the previous attempt to reach a desired intent at the call center 430 was unsuccessful, and may also provide one or more signals (or information) from the call center 430 (e.g. in request 408) to the assistance bot 470 from which the assistance bot 470 may formulate the next webhook/API. The iterative process may repeat until the call server 460 is successful, or until the assistance bot 470 tells the call server 460 to stop (i.e. hangup). For example, a sample sequence of webhooks could be: getAuthenticated, requestValidation, handleRequest (this would tell the call server 460 what's the menu to dial at the call center 430), retryRequest, and dialDevice (i.e. calling device 402). The sequence of webhooks could change based on the request 408 sent by the call server 460 along with the webhooks. In at least some implementations, the starting point (init) and end point (hangup) may be the same, but one or more webhook paths may vary. In other words, in at least some implementations, there may be different routes through an automated menu of a call center 430 to reach the same desired destination (analogous to driving to a desired destination along different driving routes).

Once the intent of the original request 404 is achieved after execution of the menu execution path (e.g. a customer service representative of Company Z is on the line), the call server 460 may place a connecting call 420 to the calling device 402 confirming that the intent of the request 404 has been achieved. In at least some implementations, the call server 460 may notify the customer service representative (the intent of the request) that they are now being connected with a caller and requesting the customer service representative to hold the line until the connection is completed. In the embodiment shown in FIG. 4, upon successfully reaching the calling device 402, the connecting call 420 (e.g. a three-way call, multi-party call, transfer call, etc.) may then open a communication channel 422 between the calling device 402 and the call center 430 in accordance with the intent of the request 404 (e.g. so that the caller can speak with the customer service representative of Company Z).

Figure 5:
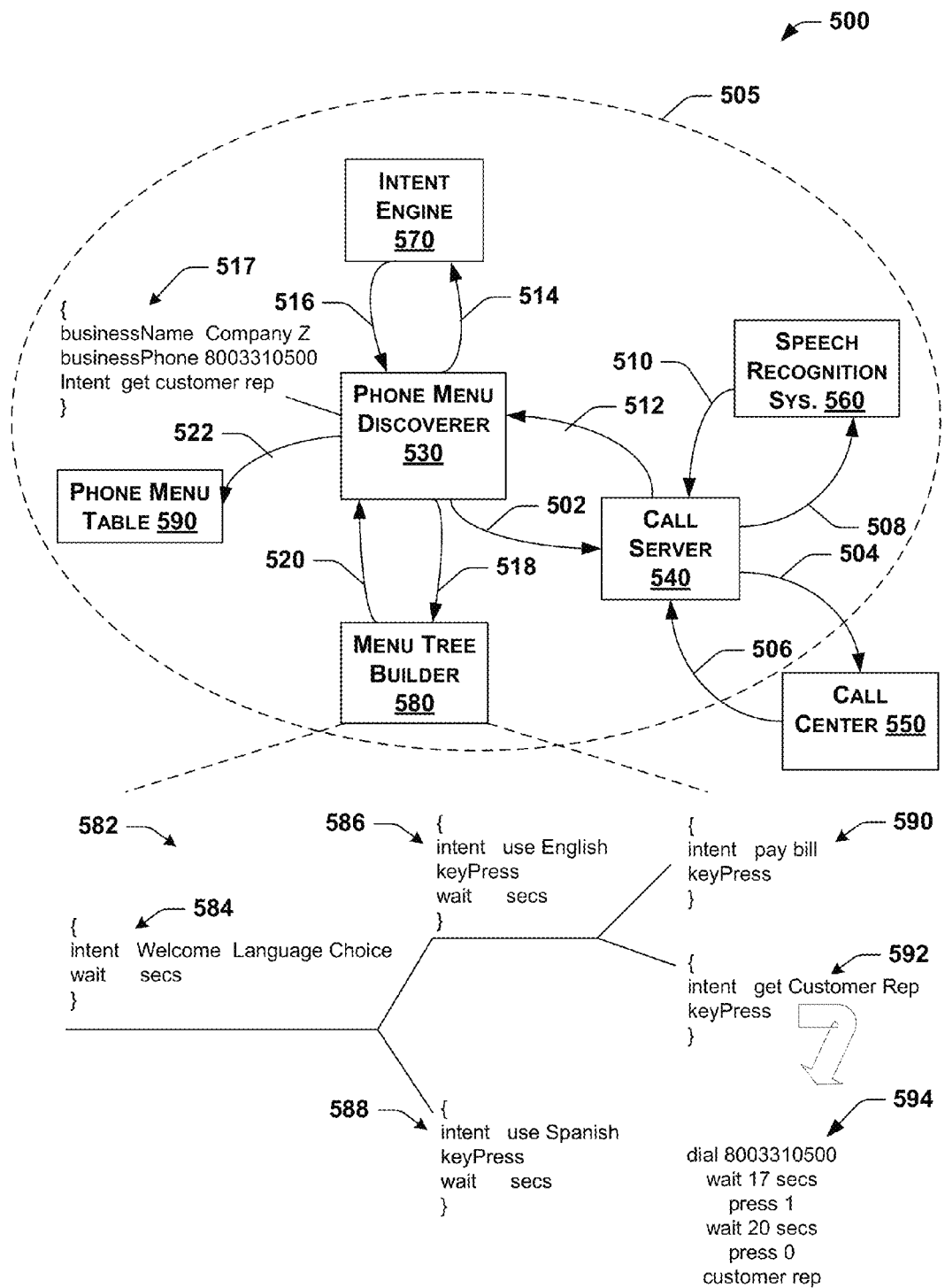
FIG. 5 shows an embodiment of a caller assistance system.

FIG. 5 shows another embodiment 500 of a caller assistance system 505 in accordance with the present disclosure. In this embodiment, the caller assistance system 505 includes a phone menu discoverer 530 that is configured to communicate with a call server 540. More specifically, the phone menu discoverer 530 is configured to systematically communicate with one or more call centers (e.g. call center 550), either directly or via the call server 540 (as shown in FIG. 5) to ascertain and create information indicating the structure of the automated menu of the one or more call centers (e.g. call center 550). The phone menu discoverer 530 is further configured to communication with an intent engine 570, a menu tree builder 580, and a phone menu table 590. In turn, the call server 540 is configured to communicate with a call center 550 that includes an automated call-routing system, and a speech recognition system 560. In at least some implementations, one or more components of the caller assistance system 505 may be configured to operate on a single computing device (e.g. the call server 540), or alternately, may be configured to operate on one or more separate hardware devices (not shown). As described more fully below, in at least some implementations, the caller assistance system 505 is configured to perform operations associated with constructing and storing menu execution paths that are then available for use to provide assistance to callers.

More specifically, in the embodiment shown in FIG. 5, the phone menu discoverer 530 transmits a call request 502 to a call server 540, and in turn, the call server 540 places a call 504 to the call center 550 in accordance with the call request 502. In response, the call center 550 provides one or more audio outputs 506 from an automated call-routing system (e.g. IVR system). The call server 540 receives the one or more audio outputs 506 from the call center 550, records the one or more audio outputs 506, and provides the recordings 508 to the speech recognition system 560. The speech recognition system 560 processes the recordings, converts the recorded audio outputs from the call center 550 into text, and provides 510 the text to the call server 540. In turn, the call server 540 provides the text in a response 512 to the phone menu discoverer 530.

As further shown in FIG. 5, the phone menu discoverer 530 may then transmit 514 the text to the intent engine 570. The intent engine 570 may analyze the text representing one or more portions of a menu of the automated call-routing system of the call center 550, and may determine one or more intents (or desired destinations) from the text (e.g. customer service representative, automated billing system, technical support, account balance information, personal information update system, etc.). The one or more intents determined by the intent engine 570 may then be transmitted 516 back to the phone menu discoverer 530. For instance, an example of an intent 517 generated by the intent engine 570 is shown in FIG. 5. In this embodiment, the intent 517 specifies a business name (i.e. "Company Z"), a business phone number (e.g. "8003310500"), and an intent or desired destination (i.e. "get customer representative").

In the embodiment shown in FIG. 5, the phone menu discoverer 530 transmits 518 the one or more intents determined by the intent engine 570, along with the text from the speech recognition system 560, to the menu tree builder 580. The menu tree builder 580 analyzes the text, and the one or more intents, and builds a menu tree corresponding to the menu structure associated with the one or more intents determined by the intent engine 570. For example, FIG. 5 shows a representative example of a menu tree 582 created by the menu tree builder 580. In this embodiment, the menu tree 582 includes a first intent 584 (i.e. "Welcome language choice"), and branches to a second intent 586 (i.e. "use English") or a third intent 588 (i.e. "use Spanish"). In addition, from the second intent 586, the menu tree 582 branches to a fourth intent 590 (i.e. "pay bill") or a fifth intent 592 (i.e. "get Customer Representative").

In at least some implementations, the menu tree builder 580 may also construct a menu execution path corresponding to each of the one or more intents contained in the menu tree 582. For example, FIG. 5 shows an embodiment of a menu execution path 594 associated with the fifth intent 592 (i.e. "get Customer Representative") of the menu tree 582. More specifically, in this embodiment, the menu execution path 594 is associated with the intent "get customer service representative of Company Z" and includes "dial 8003310500" (to reach the call center 550 of Company Z), "wait 17 seconds" (to allow the menu of the automated call-routing system to play a welcome message and inquire as to a user's choice of language (at 584), "press 1" (to opt for the second intent 586 to select English), "wait 20 seconds" (to allow the menu to recite additional menu options to select between the fourth intent 590 and the fifth intent 592), "press 0" (to elect the fifth intent 592), and "customer representative" (to listen until an actual human customer representative answers the call).

After building one or more menu trees (e.g. menu tree 584) and one or more menu execution paths (e.g. menu execution path 594), the menu tree builder 580 may transmit 520 the constructed menu trees and menu execution paths to the phone menu discoverer 530, which stores 522 the constructed menu trees and menu execution paths to the phone menu table 590. Thus, the above describe operations of the caller assistance system 505 may be iteratively repeated for any number of possible requested intents, thereby generating and storing a plurality of possible requested intents and corresponding menu execution paths associated with each of the possible requested intents, into the phone menu table 590 for future access by the caller assistance system 150 during caller assistance operations.

Figure 6:
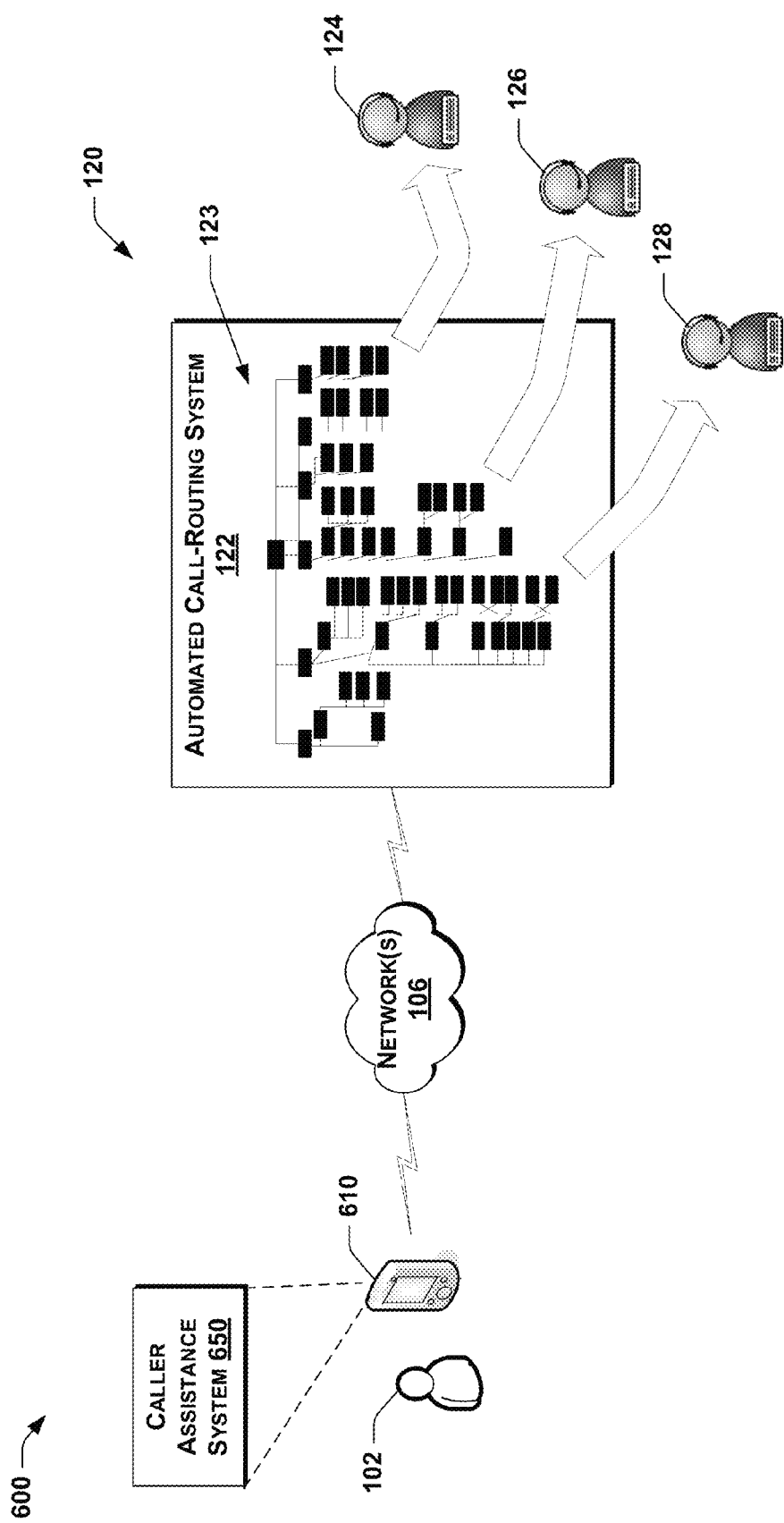
FIG. 6 shows yet another embodiment of an environment for a caller assistance system.

FIG. 6 shows yet another embodiment of an environment 600 for a caller assistance system 650. It will be appreciated that the environment 600 is similar to the environment 100 described above with reference to FIG. 1, however, in this embodiment, the assistance server 130 is eliminated, and a caller assistance system 650 is installed directed on a calling device 610. Thus, with reference to the process 300 shown in FIG. 3, when the caller assistance system 650 receives a request from the caller 102 (at 310), the request is not received at an assistance server separate from the calling device 610, but rather, is received directly into the caller assistance system 650 installed on the calling device 610. The calling device 610 is configured to place calls to a call center 120 via one or more networks 106. The call center 120 includes an automated call-routing system 122 that receives inputs in response to queries, enabling the calling device 610 to navigate through a menu 123 of possible options, eventually allowing the caller 102 to achieve a desired destination within the menu 123.

The caller assistance system 650 may be configured as shown in FIG. 2, and may include a caller assistance engine 230 and a caller assistance database 232. As described more above, the caller assistance system 650 may receive a request (e.g. an oral request from the caller 102 spoken to the calling device 610), analyze the request to determine an intent of the request, select a menu execution path that is stored within the caller assistance database 232, and execute the selected menu execution path to automatically interact with the automated call-routing system 122 of the call center 120, including executing a series of operations to reach a desired destination within the menu 123. When the desired destination (or intent) is reached within the call center 120, the caller assistance system 650 may alert the caller 102 that the connection has been made (e.g. by an audible alert such as ringing, by a visible alert such as a light or a message, by a haptic alert such as vibration, etc.). Thus, in at least some implementations, the caller assistance system 650 may perform one or more operations described above with respect to FIGS. 1-5 in an environment 600 that eliminates the need for a separate assistance server 130, and provides the caller assistance system 650 directly on the caller's calling device 610.

Figure 7:
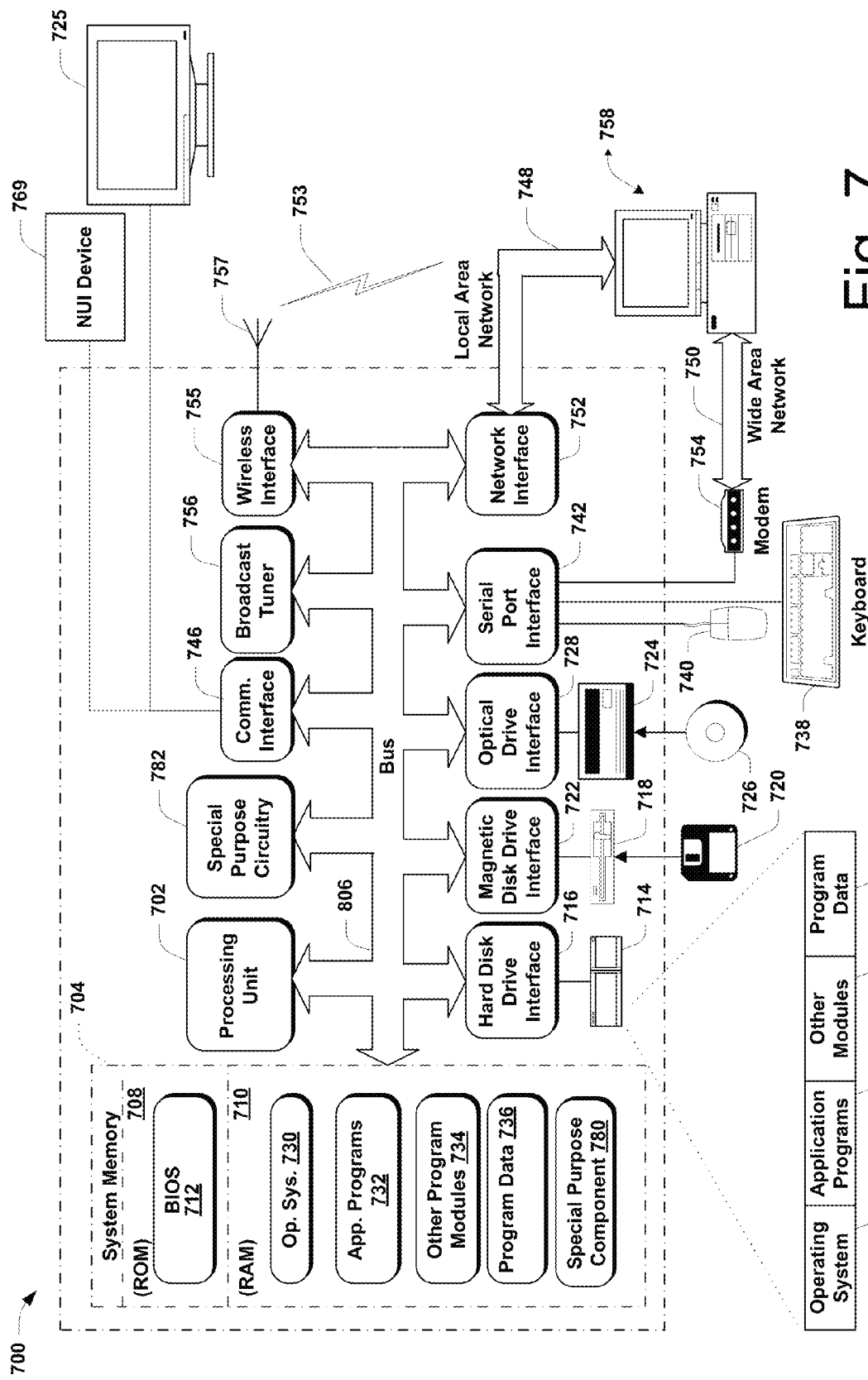
FIG. 7 shows an embodiment of a computing device environment for a caller assistance system.

FIG. 7 shows an embodiment of a computing device environment 700 for a caller assistance system in accordance with the present disclosure. As shown in FIG. 7, the example computer system environment 700 includes one or more processors (or processing units) 702, special purpose circuitry 782, memory 704, and a bus 706 that operatively couples various system components, including the memory 704, to the one or more processors 702 and special purpose circuitry 782 (e.g., Application Specific Integrated Circuitry (ASIC), Field Programmable Gate Array (FPGA), etc.).

The bus 706 may represent one or more of any of several types of bus structures, including a memory bus or memory controller, a peripheral bus, an accelerated graphics port, and a processor or local bus using any of a variety of bus architectures. In at least some implementations, the memory 704 includes read only memory (ROM) 708 and random access memory (RAM) 710. A basic input/output system (BIOS) 712, containing the basic routines that help to transfer information between elements within the system 700, such as during start-up, is stored in ROM 708.

The example system environment 700 further includes a hard disk drive 714 for reading from and writing to a hard disk (not shown), and is connected to the bus 706 via a hard disk driver interface 716 (e.g., a SCSI, ATA, or other type of interface). A magnetic disk drive 718 for reading from and writing to a removable magnetic disk 720, is connected to the system bus 706 via a magnetic disk drive interface 722. Similarly, an optical disk drive 724 for reading from or writing to a removable optical disk 726 such as a CD ROM, DVD, or other optical media, connected to the bus 706 via an optical drive interface 728. The drives and their associated computer-readable media may provide nonvolatile storage of computer readable instructions, data structures, program modules and other data for the system environment 700. Although the system environment 700 described herein employs a hard disk, a removable magnetic disk 720 and a removable optical disk 726, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

The computer-readable media included in the system memory 700 can be any available or suitable media, including volatile and nonvolatile media, and removable and non-removable media, and may be implemented in any method or technology suitable for storage of information such as computer-readable instructions, data structures, program modules, or other data. More specifically, suitable computer-readable media may include random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information. As used herein, the term "computer-readable media" is not intended to include transitory signals.

As further shown in FIG. 7, a number of program modules may be stored on the memory 704 (e.g., the ROM 708 or the RAM 710) including an operating system 730, one or more application programs 732, other program modules 734, and program data 736 (e.g., the data store 720, image data, audio data, three dimensional object models, etc.). Alternately, these program modules may be stored on other computer-readable media, including the hard disk, the magnetic disk 720, or the optical disk 726. For purposes of illustration, programs and other executable program components, such as the operating system 730, are illustrated in FIG. 7 as discrete blocks, although it is recognized that such programs and components reside at various times in different storage components of the system environment 700, and may be executed by the processor(s) 702 or the special purpose circuitry 782 of the system environment 700.

A user may enter commands and information into the system environment 700 through input devices such as a keyboard 738 and a pointing device 740. Other input devices (not shown) may include a microphone, joystick, game pad, satellite dish, scanner, or the like. Still other input devices, such as a Natural User Interface (NUI) device 769, or user interface 725, include or involve one or more aspects of a Natural User Interface (NUI) that enables a user to interact with the system environment 700 in a "natural" manner, free from artificial constraints imposed by conventional input devices such as mice, keyboards, remote controls, and the like. For example, in at least some embodiments, the NUI device 769 may rely on speech recognition, touch and stylus recognition, one or more biometric inputs, gesture recognition both on screen and adjacent to the screen, air gestures (e.g. hand movement, wave, point, snap, nod, finger gesture, etc.), head and eye (or gaze) tracking, voice and speech, vision, touch, hover (e.g. maintaining position of finger or stylus proximate to a relevant portion of an interface or other location for a specified period, etc.), facial or body gestures, machine intelligence (e.g. pattern recognition, Bayesian learning algorithms, inductive learning algorithms, inference algorithms, etc.), as well as technologies for sensing brain activity using electric field sensing electrodes (EEG and related methods) to receive inputs. In addition, in at least some embodiments, an NUI may involve or incorporate one or more aspects of touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface.

These and other input devices are connected to the processing unit 702 and special purpose circuitry 782 through an interface 742 or a communication interface 746 (e.g. video adapter) that is coupled to the system bus 706. A user interface 725 (e.g., display, monitor, or any other user interface device) may be connected to the bus 706 via an interface, such as a video adapter 746. In addition, the system environment 700 may also include other peripheral output devices (not shown) such as speakers and printers.

The system environment 700 may operate in a networked environment using logical connections to one or more remote computers (or servers) 758. Such remote computers (or servers) 758 may be a personal computer, a server, a router, a network PC, a peer device or other common network node. The logical connections depicted in FIG. 7 include one or more of a local area network (LAN) 748 and a wide area network (WAN) 750. Such networking environments are commonplace in offices, enterprise-wide computer networks, intranets, and the Internet. In this embodiment, the system environment 700 also includes one or more broadcast tuners 756. The broadcast tuner 756 may receive broadcast signals directly (e.g., analog or digital cable transmissions fed directly into the tuner 756) or via a reception device (e.g., via an antenna 757, a satellite dish, etc.).

When used in a LAN networking environment, the system environment 700 may be connected to the local area network 748 through a network interface (or adapter) 752. When used in a WAN networking environment, the system environment 700 typically includes a modem 754 or other means (e.g., router) for establishing communications over the wide area network 750, such as the Internet. The modem 754, which may be internal or external, may be connected to the bus 706 via the serial port interface 742. Similarly, the system environment 700 may exchange (send or receive) wireless signals 753 with one or more remote devices using a wireless interface 755 coupled to a wireless communicator 757 (e.g., an antenna, a satellite dish, a transmitter, a receiver, a transceiver, a photoreceptor, a photodiode, an emitter, a receptor, etc.).

In a networked environment, program modules depicted relative to the system environment 700, or portions thereof, may be stored in the memory 704, or in a remote memory storage device. More specifically, as further shown in FIG. 7, a special purpose component 780 may be stored in the memory 704 of the system environment 700. The special purpose component 780 may be implemented using software, hardware, firmware, or any suitable combination thereof. In cooperation with the other components of the system environment 700, such as the processing unit 702 or the special purpose circuitry 782, the special purpose component 780 may be operable to perform one or more implementations of techniques and technologies described above (e.g., FIGS. 1-6).

Generally, application programs and program modules executed on the system environment 700 may include routines, programs, objects, components, data structures, etc., for performing particular tasks or implementing particular abstract data types. These program modules and the like may be executed as a native code or may be downloaded and executed, such as in a virtual machine or other just-in-time compilation execution environments. Typically, the functionality of the program modules may be combined or distributed as desired in various implementations.

In view of the disclosure of techniques and technologies for caller assistance systems as disclosed herein, a few representative embodiments are summarized below. It should be appreciated that the representative embodiments described herein are not intended to be exhaustive of all possible embodiments, and that additional embodiments may be readily conceived from the disclosure of techniques and technologies provided herein.

For example, in at least some implementations, a caller assistance system, comprises: a processing component operatively coupled to a memory; a caller assistance engine at least partially stored on the memory, the caller assistance engine including one or more instructions executable by the processing component configured to perform one or more operations including at least: receiving a request from a calling device; selecting a menu execution path associated with the request, the menu execution path defining one or more operations to be performed to achieve an intent of the request; executing the menu execution path including executing the one or more operations to be performed to achieve the intent of the request; determining whether the intent of the request has been achieved; and when the intent of the request has been achieved, at least one of: connecting the calling device with the intent of the request, or providing an alert to the calling device that the intent of the request has been achieved.

In at least some implementations, receiving a request from a calling device comprises receiving at least one of a written request, a Short Message System (SMS) message, a text message, an audible request, or a spoken request. In at least some further implementations, selecting a menu execution path associated with the request, the menu execution path defining one or more operations to be performed to achieve an intent of the request comprises: analyzing the request received from the calling device; determining the intent embodied within the request; matching the intent with a possible requested intent stored within a data store; and selecting a menu execution path associated with the possible requested intent from the data store. In still other implementations, selecting a menu execution path associated with the request, the menu execution path defining one or more operations to be performed to achieve an intent of the request comprises: analyzing a text version of the request to determine one or more keywords contained within the text version of the request; and matching the one or more keywords contained within the text version of the request with one or more corresponding keywords of at least one possible intent stored within a data store.

In addition, in at least some implementations, the one or more operations to be performed to achieve an intent of the request comprises: providing an audio signal indicative of a number on a keypad being pressed. Similarly, in at least some other implementations, the one or more operations to be performed to achieve an intent of the request comprises: providing a speech input simulating a person speaking in response to a query. And in at least some further implementations, the one or more operations to be performed to achieve an intent of the request comprises: providing personal information associated with a user of the calling device in response to a query.

In at least some further implementations, executing the menu execution path including executing the one or more operations to be performed to achieve the intent of the request comprises: executing the menu execution path including executing the one or more operations to be performed to achieve the intent of the request, wherein the one or more operations include at least one of: providing an audio signal indicative of a number on a keypad being pressed; providing a speech input simulating a person speaking in response to a query; or providing personal information associated with a user of the calling device in response to a query.

And in still further implementations, determining whether the intent of the request has been achieved comprises: receiving an audio signal; and determining whether the audio signal is indicative of a voice of an actual human. In still other implementations, determining whether the intent of the request has been achieved comprises: receiving an audio signal indicative of a human speech; and performing a speech recognition process on the audio signal to determine whether the intent of the request has been achieved.

In at least some implementations, receiving a request from a calling device comprises: receiving a request from a remote calling device at an assistance server. In some other implementations, receiving a request from a calling device comprises: receiving a request from an input component of a calling device into a caller assistance component of the calling device.

Alternately, in at least some implementations, a caller assistance system, comprises: a processing component operatively coupled to a memory; a caller assistance engine at least partially stored on the memory, the caller assistance engine including one or more instructions executable by the processing component configured to perform one or more operations including at least: contacting an automated call-routing system; translating one or more voice scripts output by the automated call-routing system into one or more intents; constructing one or more menu execution paths, each menu execution path defining one or more operations to be performed to achieve a corresponding one of the one or more intents; and storing the one or more menu execution paths and the one or more intents into a data store, each menu execution path being associated with the corresponding one of the one or more intents.

In at least some additional implementations, contacting an automated call-routing system comprises: placing one or more telephone calls to an automated call-routing system. In further implementations, translating one or more voice scripts output by the automated call-routing system into one or more intents comprises: recording audible inputs from the automated call-routing system; performing a voice recognition analysis of the audible inputs to convert the audible inputs into text; and analyzing the text to determine the one or more intents. In still further implementations, translating one or more voice scripts output by the automated call-routing system into one or more intents further comprises: analyzing the text to determine one or more possible responsive outputs for providing back to the automated call-routing system to achieve the one or more intents.

In at least some alternate implementations, the one or more operations to be performed to achieve a corresponding one of the one or more intents comprises: at least one of: providing an audio signal indicative of a number on a keypad being pressed; providing a speech input simulating a person speaking in response to a query; or providing personal information associated with a user of a calling device in response to a query. In some additional implementations, contacting an automated call-routing system comprises: crawling a plurality of automated call-routing systems.

Furthermore, in at least some implementations, a method of providing assistance to a caller, comprises: receiving a request from a calling device; analyzing the request received from the calling device using at least one processing component; determining the intent embodied within the request using the at least one processing component; matching the intent with a possible requested intent stored within a data store using the at least one processing component; selecting a menu execution path associated with the possible requested intent from the data store using the at least one processing component, the menu execution path defining one or more operations to be performed to achieve an intent of the request; executing the menu execution path including executing the one or more operations using the at least one processing component to achieve the intent of the request; determining whether the intent of the request has been achieved using the at least one processing component; and when the intent of the request has been achieved, at least one of: connecting the calling device with the intent of the request using the at least one processing component, or providing an alert to the calling device using the at least one processing component that the intent of the request has been achieved.

In still further implementations, matching the intent with a possible requested intent stored within a data store using the at least one processing component comprises: analyzing a text version of the request using the at least one processing component to determine one or more keywords contained within the text version of the request; and matching the one or more keywords contained within the text version of the request with one or more corresponding keywords of at least one possible intent stored within a data store using the at least one processing component.

Conclusion

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. It will be appreciated that the embodiments of techniques and technologies described above are not exhaustive of all possible embodiments considered to be within the scope of the present disclosure, and that additional embodiments may be conceived based on the subject matter disclosed herein. For example, in alternate embodiments one or more elements or components of the techniques and technologies described above may be rearranged, re-ordered, modified, or even omitted to provide additional embodiments that are still considered to be within the scope of the present disclosure.

Alternately, or in addition, the techniques and technologies described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Although the subject matter has been described in language specific to structural features and/or acts, it is to be understood that the subject matter defined in the appended claims is not necessarily limited to the specific features or acts described. Rather, the specific features and acts described above are disclosed as examples of implementing the claims and other equivalent features and acts are intended to be within the scope of the claims. The various embodiments and implementations described above are provided by way of illustration only and should not be construed as limiting various modifications and changes that may be made to the embodiments and implementations described above without departing from the spirit and scope of the disclosure.

What is claimed is:

1. A caller assistance system, comprising:
   at least one processor operatively coupled to at least one memory;
   a caller assistance engine at least partially stored in the at least one memory, the caller assistance engine including one or more instructions executable by the processing component configured to perform operations including at least:
   receiving a request from a calling device;
   interpreting the request from the calling device to determine an intent of the request, the intent of the request including a destination provided by an interactive call-routing system;
   selecting a menu execution path associated with the request, the menu execution path being stored in the at least one memory and defining one or more operations to be performed to reach the destination provided by the interactive call-routing system to achieve an intent of the request;
   retrieving the selected menu execution path defining the one or more operations from the at least one memory;
   executing the menu execution path including executing the one or more operations to be performed to provide one or more inputs to the interactive call-routing system to reach the destination to achieve the intent of the request, including transmitting one or more audio signals to the interactive call-routing system in a pre-determined sequence as defined by the menu execution path;
   determining whether the intent of the request has been achieved; and
   when the intent of the request has been achieved, at least one of:
   connecting the calling device with the destination provided by the interactive call-routing system, or
   providing an alert to the calling device that the intent of the request has been achieved.

2. The system of claim 1, wherein receiving a request from a calling device comprises:
   receiving at least one of a written request, a Short Message System (SMS) message, a text message, an audible request, or a spoken request.

3. The system of claim 1, wherein selecting a menu execution path associated with the request, the menu execution path being stored in the at least one memory and defining one or more operations to be performed to reach a destination provided by an interactive call-routing system to achieve an intent of the request comprises:
   analyzing the request received from the calling device;
   determining the intent embodied within the request;
   matching the intent with a possible requested intent stored within a data store; and
   selecting a menu execution path associated with the possible requested intent from the data store.

4. The system of claim 1, wherein selecting a menu execution path associated with the request, the menu execution path being stored in the at least one memory and defining one or more operations to be performed to reach a destination provided by an interactive call-routing system to achieve an intent of the request comprises:
   analyzing a text version of the request to determine one or more keywords contained within the text version of the request; and
   matching the one or more keywords contained within the text version of the request with one or more corresponding keywords of at least one possible intent stored within a data store.

5. The system of claim 1, wherein the one or more operations to be performed to achieve an intent of the request comprises:
   providing an audio signal indicative of a number on a keypad being pressed.

6. The system of claim 1, wherein the one or more operations to be performed to achieve an intent of the request comprises:
   providing a speech input simulating a person speaking in response to a query.

7. The system of claim 1, wherein the one or more operations to be performed to achieve an intent of the request comprises:
   providing personal information associated with a user of the calling device in response to a query.

8. The system of claim 1, wherein executing the menu execution path including executing the one or more operations to be performed to provide one or more inputs to the interactive call-routing system to reach the destination to achieve the intent of the request comprises:
   executing the menu execution path including executing the one or more operations to be performed to achieve the intent of the request, wherein the one or more operations include at least one of:
   providing an audio signal indicative of a number on a keypad being pressed;

providing a speech input simulating a person speaking in response to a query; or providing personal information associated with a user of the calling device in response to a query.

9. The system of claim 1, wherein determining whether the intent of the request has been achieved comprises:
   receiving an audio signal; and
   determining whether the audio signal is indicative of a voice of an actual human.

10. The system of claim 1, wherein determining whether the intent of the request has been achieved comprises:
    receiving an audio signal indicative of a human speech; and
    performing a speech recognition process on the audio signal to determine whether the intent of the request has been achieved.

11. The system of claim 1, wherein receiving a request from a calling device comprises:
    receiving a request from a remote calling device at an assistance server.

12. The system of claim 1, wherein receiving a request from a calling device comprises:
    receiving a request from an input component of a calling device into a caller assistance component of the calling device.

13. A caller assistance system, comprising:
    at least one processor operatively coupled to at least one memory;
    a caller assistance engine at least partially stored in the at least one memory, the caller assistance engine including one or more instructions executable by the processing component configured to perform operations including at least:
       contacting an interactive call-routing system;
       translating one or more audible scripts output by the interactive call-routing system into one or more intents;
       constructing one or more menu execution paths, each menu execution path defining one or more operations to be performed to reach a destination provided by an interactive call-routing system to achieve at least one intent of the one or more intents;
       storing the one or more menu execution paths and the one or more intents into a data store within the at least one memory, each menu execution path being associated with the at least one intent of the one or more intents; and
       providing a user interface that is configured to:
          receive a request from a calling device;
          analyze the request received from the calling device;
          determine a specific intent embodied within the request;
          match the intent with a possible requested intent stored within the data store;
          retrieve the menu execution path associated with the possible requested intent from the data store; and
          perform the menu execution path to reach a destination provided by a particular interactive call-routing system to achieve the specific intent of the request, including transmitting one or more audio signals to the interactive call-routing system in a pre-determined sequence as defined by the menu execution path.

14. The system of claim 13, wherein contacting an interactive call-routing system comprises:
    placing one or more telephone calls to an interactive call-routing system.

15. The system of claim 13, wherein translating one or more audible scripts output by the interactive call-routing system into one or more intents comprises:
    recording audible inputs from the interactive call-routing system;
    performing a voice recognition analysis of the audible inputs to convert the audible inputs into text; and
    analyzing the text to determine the one or more intents.

16. The system of claim 15, wherein translating one or more audible scripts output by the interactive call-routing system into one or more intents further comprises:
    analyzing the text to determine one or more possible responsive outputs for providing back to the interactive call-routing system to achieve the one or more intents.

17. The system of claim 13, wherein the one or more operations to be performed to reach a destination provided by an interactive call-routing system to achieve at least one intent of the one or more intents comprises:
    at least one of:
    providing an audio signal indicative of a number on a keypad being pressed;
    providing a speech input simulating a person speaking in response to a query; or
    providing personal information associated with a user of a calling device in response to a query.

18. The system of claim 13, wherein contacting an interactive call-routing system comprises:
    crawling a plurality of interactive call-routing systems.

19. A method of providing assistance to a caller, comprising:
    receiving a request from a calling device;
    analyzing the request received from the calling device using at least one processing component;
    determining the intent embodied within the request using the at least one processing component;
    matching the intent with a possible requested intent stored within a data store using the at least one processing component;
    selecting a menu execution path associated with the possible requested intent from the data store using the at least one processing component, the menu execution path defining one or more operations to be performed to reach a destination provided by an interactive call-routing system to achieve an intent of the request;
    retrieving the selected menu execution path defining the one or more operations from the data store;
    executing the menu execution path including executing the one or more operations using the at least one processing component to provide one or more inputs to the interactive call-routing system to reach the destination to achieve the intent of the request, including transmitting one or more audio signals to the interactive call-routing system in a pre-determined sequence as defined by the menu execution path;
    determining whether the intent of the request has been achieved using the at least one processing component; and
    when the intent of the request has been achieved, at least one of:
       connecting the calling device with the destination provided by the interactive call-routing system using the at least one processing component, or
       providing an alert to the calling device using the at least one processing component that the intent of the request has been achieved.

20. The method of claim 19, wherein matching the intent with a possible requested intent stored within a data store using the at least one processing component comprises:
- analyzing a text version of the request using the at least one processing component to determine one or more keywords contained within the text version of the request; and
- matching the one or more keywords contained within the text version of the request with one or more corresponding keywords of at least one possible intent stored within a data store using the at least one processing component.

\* \* \* \* \*